Aug. 4, 1959  F. O. YAKEL ET AL  2,897,624
CONSERVATION FISHHOOKS
Filed June 27, 1958
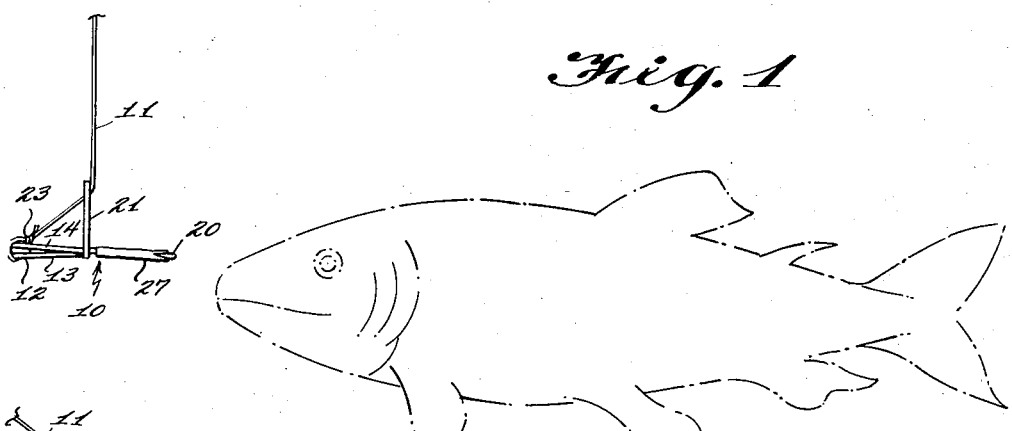
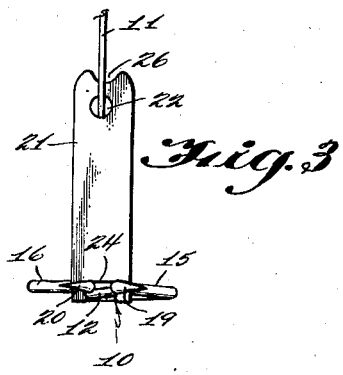
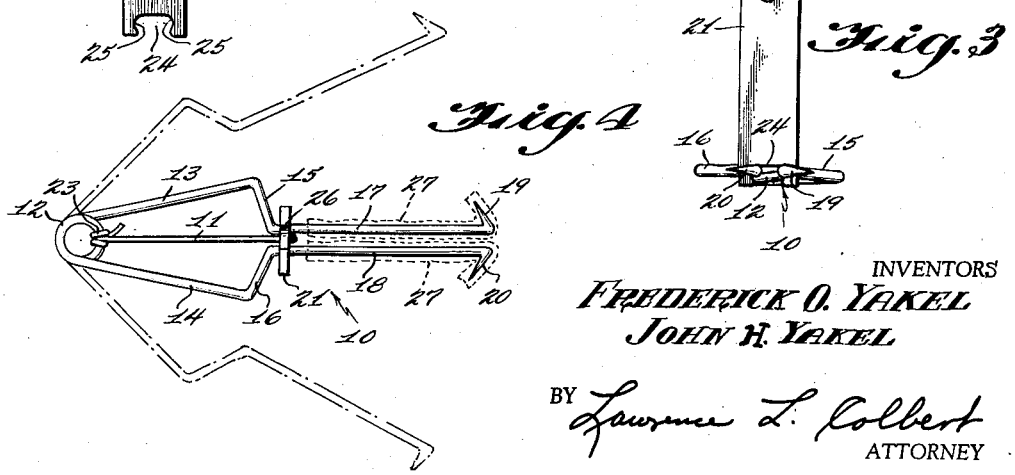
INVENTORS
FREDERICK O. YAKEL
JOHN H. YAKEL
BY Lawrence L. Colbert
ATTORNEY

United States Patent Office 2,897,624
Patented Aug. 4, 1959

2,897,624

CONSERVATION FISHHOOKS

Frederick O. Yakel and John H. Yakel, Pomona, N.Y.

Application June 27, 1958, Serial No. 745,147

1 Claim. (Cl. 43—36)

The present invention relates to conservation fishhooks, and particularly to fishhooks which will not permanently injure the fish.

In conventional fishhook with its curved end and barb adjacent its point withdrawal of the hook from the mouth of the fish is not readily accomplished without causing irreparable damage to the extent that if the fish is thrown back into the water it will normally die. The reason for this is that the hook deeply embeds itself into the fish's mouth and it is therefore necessary to jerk the hook to release same and thereby cause a deep wound which causes extensive loss of blood. It is desirable that fish which are not desired by the fisherman, which is usually because of its size and the applicable fishing conservation laws, be returned to the stream in a manner which will preserve their life. The invention which forms the subject matter of this application is directed toward such conservation since the hook can readily be removed from the mouth of the fish since it does not deeply embed itself into the mouth of the fish and the points do not go deep into the flesh of the fish. Therefore it is not necessary to jerk the hook out of the mouth of the fish. A mere squeezing together of the legs of the fishhook releases it since the point of the hook does not have a barb and the hook only penetrates the flesh, the depth of the point portion which is small, being enough to practically only hold the fish.

The primary object of the invention therefore is to provide a conservation fishhook from which the fish can be dislodged without tearing the mouth of the fish.

Another object of the invention is to provide a conservation fishhook having spring means for maintaining the hook in engagement with the mouth of a fish.

A further object of the invention is to provide a conservation fishhook in which the hook is normally maintained in a closed position and is released to open position by action of the fish taking the bait, or the pulling of the fishing line by the fisherman to release the trigger.

A still further object of the invention is to provide a conservation fishhook having an effective release trigger which is mounted on the fishline to prevent its loss.

Another object of the invention is to provide a fishhook of the class described above formed of a minimum of operating parts so as to be inexpensive to manufacture, simple to bait, and easy to remove from the mouth of the fish caught thereon.

Other objects and advantages will become apparent in the following specification when considered in the light of the attached drawings, in which:

Figure 1 is a side elevation of the invention shown with a fish in broken lines about to strike.

Figure 2 is a side elevation of the invention with a fish shown in broken lines caught on the hook.

Figure 3 is an end elevation showing the hook in closed position.

Figure 4 is an enlarged top plan view illustrating the hook in closed position with the open position thereof shown in broken lines.

Figure 5 is a front elevation of the trigger element shown detached from the fishline and fishhook.

Referring now to the drawings in detail wherein like reference characters indicate like parts throughout the several figures, the reference numeral 10 indicates generally a conservation fishhook constructed in accordance with the invention.

The conservation fishhook 10 is secured to a conventional fishline 11 which may be formed of flexible leader material if desired. The conservation fishhook 10 includes a coil spring 12 having a pair of arms 13, 14 extending from opposite ends thereof in a spaced apart diverging relation to each other. The arms 13, 14 are of equal length and are biased by the spring 12 so as to be normally urged apart.

The arms 13, 14 are each provided with inwardly offset portions 15, 16, respectively. The offset portions 15, 16 are of equal length to each other.

An elongated shank 17 is integrally formed on the end of the offset portion 15 opposite the arm 13, and a second elongated shank 18 is integrally secured to the end of the offset portion 16 opposite the arm 14. The elongated shanks 17, 18 are arranged so as to be parallel to each other when the arms 13, 14 are in their innermost position.

A barbless point 19 is integrally formed on the free end of the shank 17, and a second barbless point, 20 is integrally formed on the free end of the shank 18. The barbless points 19, 20 extend outwardly at acute angles to the shanks 17, 18, as best shown in Figure 4.

A generally rectangular trigger bar 21 is provided with a bore 22 adjacent one end thereof through which the fishline 11 extends. The fishline 11 is knotted at 23 securing it to the coil spring 12, as best shown in Figures 1 and 4.

The trigger bar 21 is provided with a relatively wide notch 24 in the end thereof opposite the bore 22 to engage the shanks 17, 18 when in parallel position, as shown in Figures 3 and 4. The notch 24 is arcuately formed at 25 on each side thereof to provide a positive engagement of the shanks 17, 18 therewith.

The trigger bar 21 is notched at 26 at the end thereof opposite the notch 24 to provide a guide for the line 11 during fishing operations.

As shown in Figure 1, and in broken lines in Figure 4, bait worms 27 are empaled on the points 19, 20 and shanks 17, 18 to be readily accessible for a fish to strike.

In the use and operation of the invention, the shanks 17, 18 and points 19, 20 are baited, and the arms 13, 14 are squeezed to bring the shanks 17, 18 in parallel relation to the position illustrated in Figure 4. The trigger bar 21 is then engaged over the shanks 17, 18 so that the shanks 17, 18 are grasped in the notch 24 and the fishing then proceeds in the conventional manner.

The grasping of the baited shanks 17, 18 and points 19, 20 by a fish creates sufficient force to pull the shanks 17, 18 out of the notch 24 so that the coil spring 12 can separate the arms 13, 14, and hence the shanks 17, 18 to the dotted line position illustrated in Figure 4, with the points 19, 20 engaging opposite portions of the mouth of the fish. The fishhook is prevented from going too deeply into the mouth of the fish since the trigger 21 serves as a stop. The fisherman may also release the trigger when he detects jerking motion on the line caused by nibbling of the bait by the fish, by merely pulling on the fishline.

Obviously with the pressure of the coil spring 12 maintaining the shanks 17, 18 in their spread apart position, the fish is completely unable to disengage himself from the hook. After the fish has been landed in the boat, the conservation hook 10 can be easily detached therefrom by grasping the arms 13, 14, pressing the shanks 17 and 18 into parallel relation so that the points 19, 20 can be quickly dislodged without tearing the mouth of the fish.

As can be readily seen, a fish caught on the conservation hook 10 will be free of torn places in the mouth which are normal with the use of barbed fishhooks, and should it become necessary to return the fish due to its size, the lack of injury will permit it to develop normally.

Having thus described the preferred embodiment of the invention, it should be understood that numerous structural modifications and adaptations may be resorted to without departing from the scope of the appended claim.

We claim:

A conservation fishhook comprising a coil spring, a pair of diverging arms integrally extending from opposite ends of said coil spring and normally biased apart thereby, an inwardly offset portion integrally formed on the ends of said arms opposite said spring, an elongated shank integrally secured to the end of each of said offset portions opposite said arm and extending at an angle thereto generally away of said arms, a barbless pointed relatively short hook integrally formed on each of said shanks on the end thereof opposite said offset portions, said hooks extending outwardly at an angle sloping slightly toward said coil spring, said arms, offset portions, shanks and hooks being substantially in a single plane, a generally rectangular elongated upright trigger bar, said trigger bar having an arcuate notch formed in the lower end thereof, the upper end portion of said trigger bar having a bore, a flexible line having one end secured to said coil spring with said line threaded through said bore, said trigger bar and stop plate having the arcuate notch therein releasably engaged over said shanks with said shanks in adjacent parallel relation in a preselected adjustable position between said offset portions and said hooks near the center of gravity of the said fishhook, said shanks extending generally perpendicularly to said trigger bar to suspend said fishhook in a generally horizontal position, said trigger bar limiting the depth of penetration of the shanks in the fish's mouth and being releasable from said shanks by engagement with the fish's mouth or by sharply pulling on said line whereby said shanks are biased apart by said spring to embed said hooks in the mouth of a fish.

References Cited in the file of this patent
UNITED STATES PATENTS

| | | |
|---|---|---|
| 157,480 | Perry | Dec. 8, 1874 |
| 644,489 | Anderson | Feb. 27, 1900 |
| 2,223,946 | Binkowski | Dec. 3, 1940 |